United States Patent
Fujita et al.

(10) Patent No.: US 9,407,552 B2
(45) Date of Patent: Aug. 2, 2016

(54) DEVICE AND SYSTEM FOR PREVENTING CONGESTION IN AD-HOC NETWORK

(71) Applicant: FUJITSU LIMITED, Kawasaki-shi, Kanagawa (JP)

(72) Inventors: Hiroshi Fujita, Yokosuka (JP); Yun Wen, Kawasaki (JP); Makoto Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 13/933,589

(22) Filed: Jul. 2, 2013

(65) Prior Publication Data
US 2013/0294244 A1  Nov. 7, 2013

Related U.S. Application Data

(63) Continuation of application No. PCT/JP2011/051368, filed on Jan. 25, 2011.

(51) Int. Cl.
   *H04L 12/803* (2013.01)
   *H04W 28/02* (2009.01)
   *H04L 12/825* (2013.01)

(52) U.S. Cl.
   CPC .............. *H04L 47/122* (2013.01); *H04L 47/26* (2013.01); *H04W 28/021* (2013.01)

(58) Field of Classification Search
   CPC ....... H04L 47/122; H04L 47/10; H04L 47/11; H04L 47/12; H04L 47/26; H04W 28/021
   USPC ......... 370/229, 230, 231, 232, 235, 237, 351, 370/389, 395.1, 395.2, 395.21
   See application file for complete search history.

(56) References Cited

U.S. PATENT DOCUMENTS 7,489,632 B2 * 2/2009 Lakkakorpi ......... H04L 12/5695
                                                      370/229
7,522,563 B2    4/2009 Rhee
(Continued)

FOREIGN PATENT DOCUMENTS

JP   2005-510956 A   4/2005
JP   2010-516140 A   5/2010
(Continued)

OTHER PUBLICATIONS

International Search Report & Written Opinion issued in PCT/JP2011/051368, mailed Mar. 22, 2011, 9 pages.
(Continued)

*Primary Examiner* — Obaidul Huq
(74) *Attorney, Agent, or Firm* — Arent Fox LLP

(57) ABSTRACT

A communication device includes: a packet receiving unit that receives, via a wireless ad hoc network, a packet transmitted from a node device; a congestion detection unit that detects, based on the packet received by the packet receiving unit, that congestion occurs in a communication path along which the packet reaches the packet receiving unit; a congestion control message generating unit that generates, when the congestion detection unit detects that the congestion occurs in the communication path, a congestion control message that instructs to take an action to avoid the congestion in the communication path; and a message transmitting unit that transmits the congestion control message generated by the congestion control message generating unit to the node device.

13 Claims, 7 Drawing Sheets

(56) References Cited

U.S. PATENT DOCUMENTS

| | | | |
|---|---|---|---|
| 7,948,930 B2 | 5/2011 | Rhee | |
| 8,081,566 B1* | 12/2011 | Ashwood-Smith et al. | 370/230 |
| 8,098,615 B2 | 1/2012 | Rhee | |
| 2003/0048750 A1* | 3/2003 | Kobayashi | 370/229 |
| 2006/0067257 A1* | 3/2006 | Bonta | 370/310 |
| 2006/0087974 A1* | 4/2006 | Ozer et al. | 370/235 |
| 2010/0034091 A1 | 2/2010 | Hiertz et al. | |
| 2010/0165846 A1 | 7/2010 | Yamaguchi et al. | |
| 2012/0051216 A1* | 3/2012 | Zhang | H04L 47/12 370/230 |
| 2012/0147808 A1 | 6/2012 | Rhee | |

FOREIGN PATENT DOCUMENTS

| | | |
|---|---|---|
| JP | 2010-245783 A | 10/2010 |
| WO | WO 03/047175 A1 | 6/2003 |
| WO | WO 2008/035600 A1 | 3/2008 |
| WO | WO 2008/084450 A1 | 7/2008 |

OTHER PUBLICATIONS

Japanese Office Action, dated Nov. 4, 2014, issued in Japanese Patent Application No. 2012-554535.

* cited by examiner

DEVICE AND SYSTEM FOR PREVENTING CONGESTION IN AD-HOC NETWORK

CROSS-REFERENCE TO RELATED APPLICATION

This application is a continuation of International Application No. PCT/JP2011/051368, filed on Jan. 25, 2011, and designating the U.S., the entire contents of which are incorporated herein by reference.

FIELD

The embodiment discussed herein is directed to a communication device, a communication system, and a communication method.

BACKGROUND

In recent years, in monitoring control systems (for example, SCADA: supervisory control and data acquisition), attention has been given to multi hop networks in which multiple node devices configured in a tree network topology are connected with each other in wireless ad hoc communication networks by using a carrier sense method. In a multi hop network, when the reliability of packet delivery to an adjacent node device is important, a routing algorithm is used in which a packet is transferred while acknowledging the delivery of the packet between the adjacent node devices.

With the routing algorithm in which data is transferred while acknowledging the delivery of the packet between the adjacent node devices, it is known that congestion occurs along the communication path of the packet. Consequently, in a wireless ad hoc network that communicates using the carrier sense method, because node devices are added in an autonomous distributed manner, the number of node devices increases. When the number of node devices increases, the number of requests to send a packet from one node device to a node device that corresponds to the top device of the tree in a tree network (hereinafter, referred to as a gateway (GW) device) increases. Then, requests to send a packet to the gateway device conflicts with requests to send a packet (ACK: acknowledgement packet) that is used for a packet delivery acknowledgement sent from the gateway device to peripheral node devices; therefore, the opportunity to transmit an ACK from the gateway device decreases. Consequently, a delay in ACK delivery from the gateway device increases and, if the delay time exceeds the ACK waiting time, the number of packets duplicated by peripheral node devices increases. If the number of packets duplicated increases, requests to send the duplicated packets further arise. Consequently, any delay of an ACK from the gateway device further increases and thus the generation of the duplicated packets become significant, which becomes a vicious circle.

In such a case, a monitoring control system may remain unusable for a long time until congestion is relieved. Accordingly, in order to stably operate the monitoring control system, it is important to suppress the occurrence of congestion and, if congestion occurs, it is important to set up a system that promptly ceases the congestion.

To cope with this, with conventional known technology, when the traffic volume of a wireless network is measured and the measured traffic volume exceeds a certain level, the transmission rate of packets sent from node devices is decreased. Patent Document 1: Japanese National Publication of International Patent Application No. 2005-510956

However, in the conventional technology, an efficient way of suppressing the occurrence of packet congestion in wireless ad hoc networks is not considered.

Specifically, with the conventional technology, if a node device detects packet congestion in a network, the occurrence of congestion is suppressed by reducing the transmission rate of packets that are transmitted from the node device. With the conventional technology, if packet congestion in a network is detected, it is not possible to suppress the transmission rate of packets transmitted from peripheral node devices.

In contrast, in a tree network in which a gateway device is used as the top device of the tree, because packets transmitted from multiple node devices are concentrated at the gateway device, congestion tends to occur particularly in packet communication paths at the periphery of the gateway devices. At this point, as with the conventional technology, even if each of the node devices arranged at the periphery of the gateway device decreases the transmission rates of packets from their own node devices, this technology does not decrease the transmission rates by taking into consideration the congestion state of the packets concentrated at the gateway device. Accordingly, the congestion in the packet communication paths at the periphery of the gateway devices may sometimes not be efficiently suppressed. Furthermore, if an attempt to detect congestion is made at only one place, i.e., the gateway device, in accordance with the conventional technology, only the congestion occurring at the periphery of the gateway device is detected. On the other hand, if an attempt to detect congestion is made at each node device in accordance with the conventional technology, any congestion occurring in a network can be detected; however, in this case, a congestion detection function is needed for each of the node devices, which is inefficient in terms of the cost performance.

SUMMARY

According to an aspect of an embodiment, a communication device includes: a packet receiving unit that receives, via a wireless ad hoc network, a packet transmitted from a node device; a congestion detection unit that detects, based on the packet received by the packet receiving unit, that congestion occurs in a communication path along which the packet reaches the packet receiving unit; a congestion control message generating unit that generates, when the congestion detection unit detects that the congestion occurs in the communication path, a congestion control message that instructs to take an action to avoid the congestion in the communication path; and a message transmitting unit that transmits the congestion control message generated by the congestion control message generating unit to the node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiment.

Figure 1:
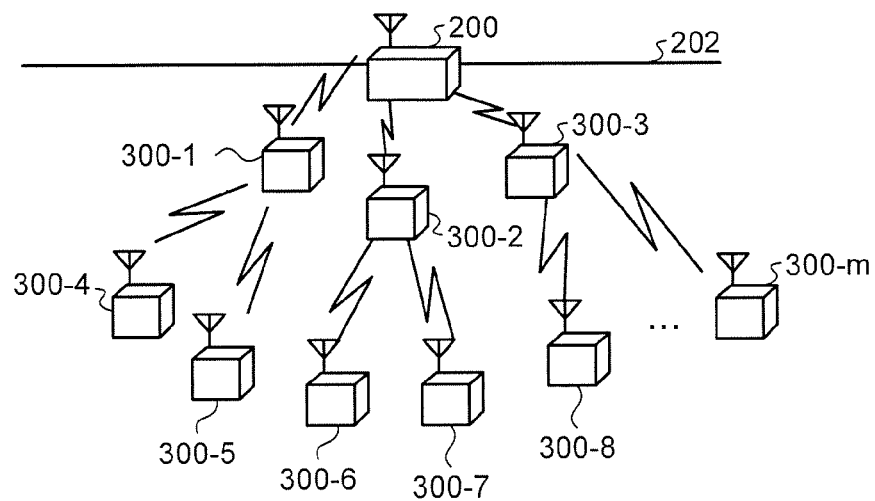
FIG. 1 is a schematic diagram illustrating the overall configuration of a communication system according to an embodiment.

FIG. 1 is a schematic diagram illustrating the overall configuration of a communication system according to an embodiment. As illustrated in FIG. 1, a communication system 100 according to the embodiment includes a gateway device 200 and multiple node devices 300-1 to 300-m (m is a natural number equal to or greater than 2) that perform wireless communication with the gateway device 200. The communication system 100 constitutes a tree network in which the node devices 300-1 to 300-m are arranged in a branched manner from the gateway device 200, which is at the top of the network hierarchy in the communication system 100. Wireless communication is available between the gateway device 200 and the node devices 300-1 to 300-m and between the node devices 300-1 to 300-m each other via a wireless ad hoc network. The node devices 300-1 to 300-m each have the same configuration; therefore, for convenience of description, where one of the node devices 300-1 to 300-m appears below, it will be referred to as node device 300. Furthermore, both the gateway device 200 and the node device 300 are communication devices.

In the embodiment, it is assumed that the node devices 300-1 to 300-3 are arranged in an area in which wireless communication is available with the gateway device 200. Furthermore, it is assumed that the node devices 300-4 to 300-m are arranged in an area in which wireless communication is available with the node devices 300-1 to 300-3. For example, if a packet is transmitted from the node device 300-8 to the gateway device 200, the node device 300-8 is not able to directly transmit the packet to the gateway device 200. Accordingly, the node device 300-8 transmits the packet to the node device 300-3 once. If the node device 300-3 receives the packet transmitted from the node device 300-8, the node device 300-3 transmits the received packet to the gateway device 200. Specifically, in this case, the node device 300-3 functions as a relay node device that relays the packet.

The node devices 300-1 to 300-3 each have a routing table in which, when one of the node devices 300-1 to 300-3 transmits a packet to the gateway device 200, information indicating that the packet is to be directly transmitted to the gateway device 200 is set. Furthermore, the node devices 300-1 to 300-3 each have a routing table in which, when one of the node devices 300-1 to 300-3 is not able to transmit a packet to the gateway device 200, a priority is previously set indicating to which node device the packet is to be transmitted. Furthermore, the node devices 300-4 to 300-m each have a routing table in which, when one of the node devices 300-4 to 300-m transmits a packet to the gateway device 200, information is set indicating to which relay node device the packet is to be transmitted. Furthermore, the node devices 300-4 to 300-m each have a routing table in which, when a packet is not able to be transmitted to the relay node device to which the packet is previously set to be transmitted, a priority is previously set indicating to which relay node device the packet is to be transmitted. The gateway device 200 is connected to another gateway device by using a communication cable 202. For the other gateway device, multiple node devices are arranged, in a similar manner to the gateway device 200, in a tree network manner.

Figure 2:
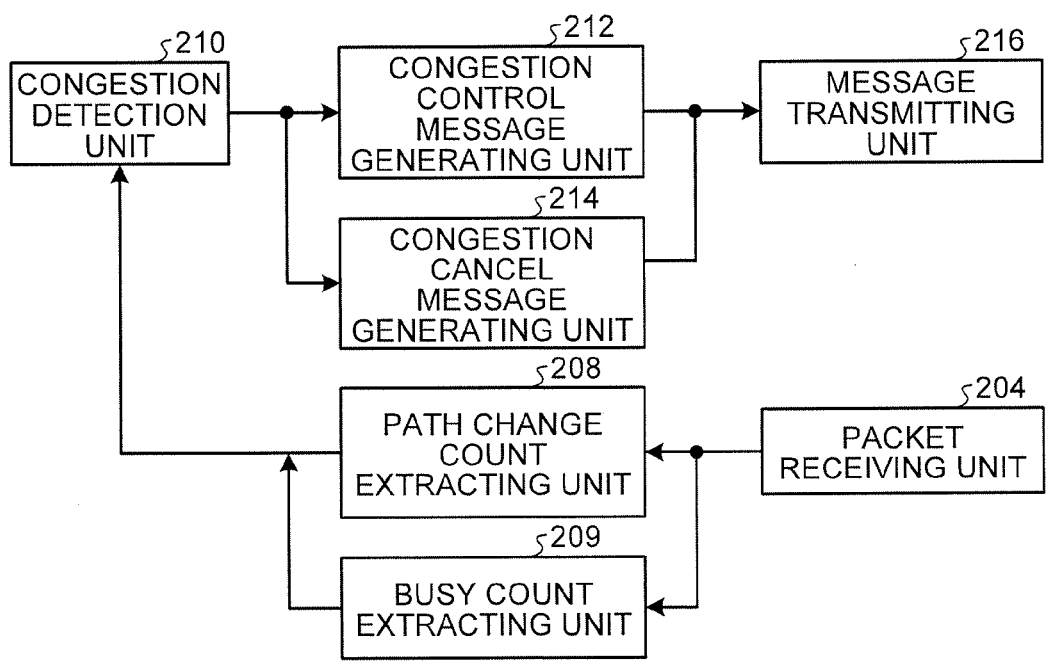
FIG. 2 is a block diagram illustrating the configuration of a gateway device according to the embodiment.

FIG. 2 is a block diagram illustrating the configuration of a gateway device 200 according to the embodiment. As illustrated in FIG. 2, the gateway device 200 according to the embodiment includes a packet receiving unit 204, a path change count extracting unit 208, and a busy count extracting unit 209. Furthermore, the gateway device 200 includes a congestion detection unit 210, a congestion control message generating unit 212, a congestion cancel message generating unit 214, and a message transmitting unit 216.

The packet receiving unit 204 receives from, for example, the node devices 300-1 to 300-3, a packet transmitted via the wireless ad hoc network. The path change count extracting unit 208 extracts, on the basis of the packet received by the packet receiving unit 204, a change count indicating the number of times the communication paths has been changed until the packet reaches the packet receiving unit 204 from the node device that is the transmission source of the packet. The path change count extracting unit 208 can extract a communication path change count on the basis of, for example, a communication path history that is attached to the received packet. The communication path history mentioned here is the history of the path of the received packet indicating which node device is used for relaying the packet that was transmitted from the transmission source node device. A relay node device identifier is attached to a packet that has been transmitted from the transmission source node device every time the packet passes through a relay node device. By referring to the relay node device identifier attached to the received packet, the path change count extracting unit 208 can extract a communication path change count.

It is assumed here, for example, that a communication path, in which the node device 300-8 is the transmission source of a packet and the packet transmitted from the node device 300-8 is transmitted to the gateway device 200 via the node device 300-3, is previously set. If the packet is transmitted in line with the previously set communication path, because the communication path of the packet is not changed, the path change count extracting unit 208 extracts a count "0" as the communication path change count. In contrast, if an attempt to transmit the packet from the node device 300-8 to the node device 300-3 is made but fails, the node device 300-8 transmits the packet to the gateway device 200 via, for example, the node device 300-2. In such a case, because the communication path of the packet is changed once, the path change count extracting unit 208 extracts a count "1" as the communication path change count. Furthermore, it is assumed that, if the packet is not able to be transmitted from the node device 300-8 to the node device 300-3 and an attempt to transmit the packet to the node device 300-2 is made but also fails, the packet is then transmitted to the gateway device 200 via, for example, the node device 300-1. In such a case, because the communication path of the packet is changed twice, the path change count extracting unit 208 extracts the count "2" as the communication path change count. A node device determines that a transmission of a packet failed if a delivery acknowledgement (ACK) packet is not sent back even though, for example, the packet has been transmitted.

Furthermore, the path change count extracting unit 208 can extract a path change count on the basis of a hop count obtained when a packet is transmitted from the transmission source node device to the gateway device 200. The hop count mentioned here indicates the number of times the packet has been transmitted from the node devices until the packet reaches the gateway device 200 when a packet is transmitted from one of the node devices 300 to the gateway device 200. For example, in a case in which a packet is transmitted to the gateway device 200 from the node device 300-4 and relayed via the node device 300-1, the packet is transmitted from the node device 300-4, reaches the node device 300-1, is transmitted from the node device 300-1, and then reaches the gateway device 200. Consequently, the hop count is "2". The path change count extracting unit 208 can obtain the hop count from the communication path history recorded in the received packet. The path change count extracting unit 208 may also previously record the smallest hop count from a node device to the gateway device 200 and extract, as the path change count, the difference between the smallest hop count and the hop count that is obtained from the communication path history of the received packet. However, the method for extracting the path change count is not limited to using the communication path history recorded in the received packet nor the difference between the hop counts. The path change count extracting unit 208 may also extract a path change count by using another method. Furthermore, the hop count also indicates, when a packet is transmitted from the gateway device 200 to the node device 300, the number of times the packet is transmitted from the gateway device 200 and the node devices until the transmitted packet reaches the node device 300, which is the destination of the packet.

When the node devices 300-1 to 300-m each transmit a packet by using the carrier sense method, the busy count extracting unit 209 obtains a busy count that is obtained when the packet reaches the packet receiving unit 204 from the transmission source node device. The carrier sense method mentioned here is a method for sensing, when, for example, the node device 300-6 attempts to transmit a packet to the node device 300-2, whether another node device (for example, the node device 300-7) is transmitting a packet to the node device 300-2. Furthermore, in the carrier sense method, it is determined whether a packet is to be transmitted to the node device 300-2 depending on the result of the sensing. For example, if the node device 300-7 is transmitting a packet to the node device 300-2, the state is busy; therefore, the node device 300-6 does not transmit the packet to the node device 300-2. In contrast, if the node device 300-7 is not transmitting the packet to the node device 300-2, the state is not busy; therefore, the node device 300-6 transmits a packet to the node device 300-2. Specifically, the busy state mentioned here is a state in which, when a first node device attempts to transmit a packet to the destination node device, a second node device is performing a transmission and thus the first node device is not able to transmit a packet. When a packet is transmitted from the transmission source node device to the gateway device 200, a busy count is counted up every time the state becomes busy and is attached to the packet as a history. In the embodiment, an example is given of the gateway device 200 that includes both the path change count extracting unit 208 and the busy count extracting unit 209; however, the gateway device 200 may also include either one of the path change count extracting unit 208 and the busy count extracting unit 209.

The congestion detection unit 210 detects, on the basis of the packet received by the packet receiving unit 204, that congestion has occurred in a communication path along which the packet reaches the packet receiving unit 204. If a communication path change count extracted by the path change count extracting unit 208 exceeds, for example, a certain control threshold, the congestion detection unit 210 detects that congestion has occurred in a communication path. Furthermore, if a busy count extracted by the busy count extracting unit 209 exceeds a certain control threshold, the congestion detection unit 210 may also detect that congestion has occurred in a communication path.

If the congestion detection unit 210 detects that congestion has occurred in a communication path, the congestion control message generating unit 212 generates a congestion control message that instructs that an action is to be taken to avoid the congestion in the communication path. Furthermore, the congestion cancel message generating unit 214 generates a congestion cancel message if the congestion detection unit 210 does not detect that the congestion has occurred in a communication path anymore after the congestion detection unit 210 detected that the congestion had occurred in the communication path. The congestion cancel message mentioned here is a message that instructs that an action taken to avoid the congestion in a communication path is cancelled.

The message transmitting unit 216 transmits, to a node device, a control/cancel message that includes the congestion control message generated by the congestion control message generating unit 212 or the congestion cancel message generated by the congestion cancel message generating unit 214. The message transmitting unit 216 broadcasts, for example, the control/cancel message that includes the congestion control message generated by the congestion control message generating unit 212 or the congestion cancel message generated by the congestion cancel message generating unit 214. The control/cancel message that has been broadcasted by the message transmitting unit 216 is transmitted to the node devices 300-1 to 300-3 that are arranged in an area in which communication is available with the gateway device 200.

Figure 3:
FIG. 3 is a schematic diagram illustrating an example of the format of a control/cancel message.

FIG. 3 is a schematic diagram illustrating an example of the format of a control/cancel message. A control/cancel message 400, as illustrated in FIG. 3, is generated by the congestion control message generating unit 212 or by the congestion cancel message generating unit 214. The control/cancel message 400 includes a control/cancel flag 402, a congestion control target ID 404, and a congestion control action type 406.

The control/cancel flag 402 is a flag that is set if a congestion control message or a congestion cancel message is generated. The flag associated with the congestion control message and the flag associated with the congestion cancel message are set such that both the flags can be identified. The congestion control target ID 404 represents an identifier of a node device, from among the node devices 300-1 to 300-m, that needs to take an action to avoid congestion. However, by not setting the congestion control target ID 404, it may also be possible to designate the node devices 300-1 to 300-m as the subject devices that need to take an action to avoid the congestion. Furthermore, for the congestion control target ID 404, in addition to individually set a unique ID of each of the node devices 300-1 to 300-m, it may also be possible to set an identifier that represents the attribute of, for example, node devices having the same hop count from the gateway device 200 or node devices adjacent to the gateway device 200.

The congestion control action type 406 represents the type of action to be taken to avoid congestion. For example, the congestion control action type 406 is set to an action type associated with at least one from among "packet disposal", "retransmission count suppression", "transfer path count suppression", and "packet transmission frequency suppression". However, instead of setting the congestion control action type 406, it may also possible to previously set the type of action to be taken to avoid congestion in the node devices 300-1 to 300-m.

If the congestion control action type 406 is set to "packet disposal", a node device disposes of a packet to be transmitted without transmitting the packet. However, instead of disposing all of the packets to be transmitted, it may also possible to set a percentage of the packet to be disposed, for example, 50%, indicating 50% of the packets to be transmitted are disposed. If the congestion control action type 406 is set to "retransmission count suppression", a node device suppresses the number of times a packet is retransmitted (retried) to the same destination when packet transmission fails. For example, by setting an upper limit of a packet retransmission count, if packet transmission fails, a node device retransmits the packet up to the set upper limit count but disposes of the packet if the retransmission count reaches the upper limit count.

If the congestion control action type 406 is set to "transfer path count suppression", a node device suppresses the number of times a packet is transmitted to another destination if the packet transmission fails. For example, an upper limit of the number of times a packet is transmitted to another destination can be set. In such a case, if a packet transmission fails, a node device transmits the packet to another destination in accordance with the previously set priority up to the set upper limit count; however, if the transmission count reaches the upper limit, the node device disposes of the packet. Furthermore, if the congestion control action type 406 is set to "packet transmission frequency suppression", a node device suppresses the frequency of the packet transmissions. For example, by setting the number of packet transmissions per unit time, a node device transmits packets in accordance with a set frequency.

Figure 4:
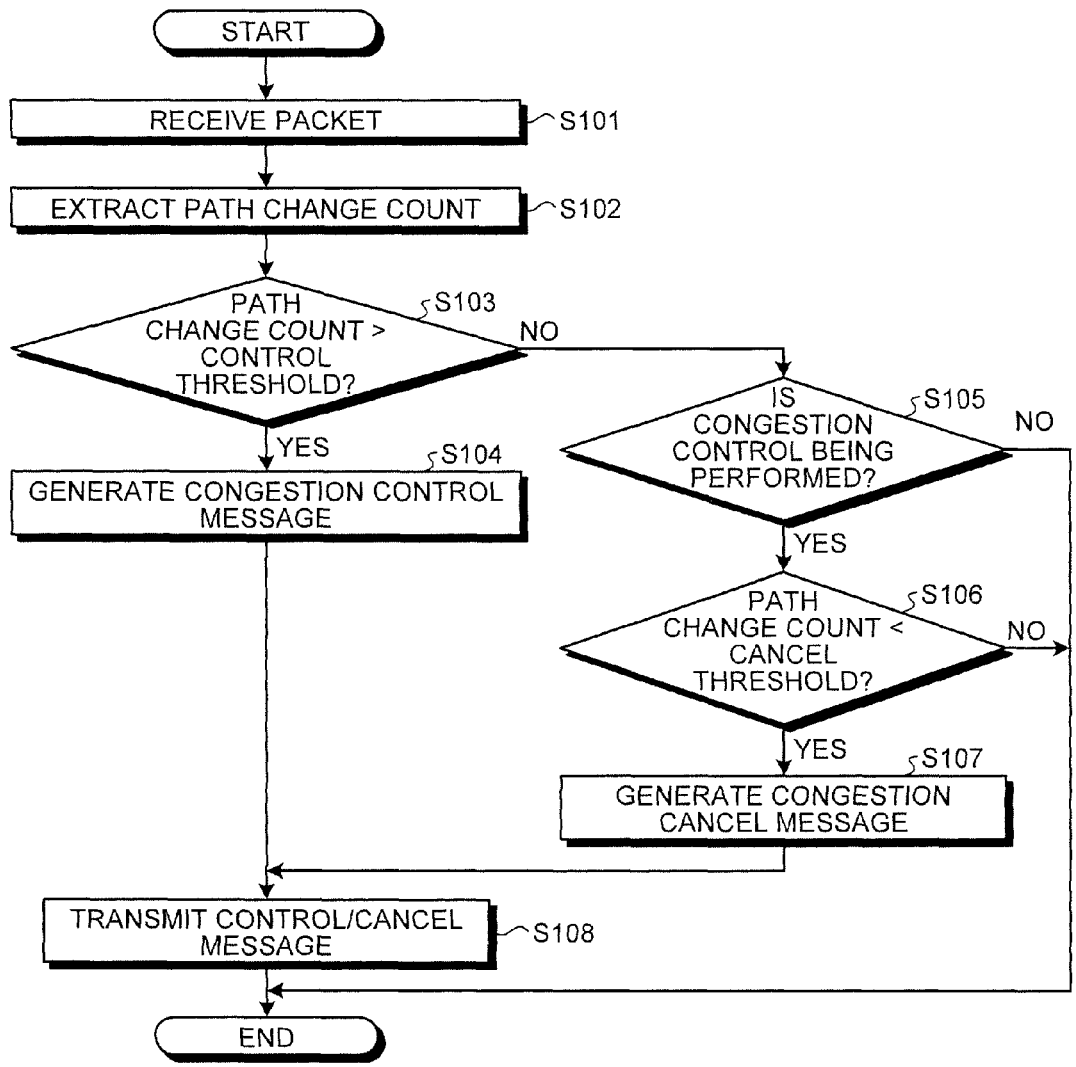
FIG. 4 is a flowchart illustrating a first process performed by the gateway device.

FIG. 4 is a flowchart illustrating a first process performed by the gateway device. As illustrated in FIG. 4, first, the packet receiving unit 204 receives a packet that was transmitted from any one of the node devices 300-1 to 300-m (Step S101). Then, on the basis of the packet received at Step S101, the path change count extracting unit 208 extracts a communication path change count indicating the number of times the communication paths have been changed until the packet reaches the packet receiving unit 204 from the node device that is the transmission source of the packet (Step S102). Then, the congestion detection unit 210 determines whether the path change count extracted at Step S102 is greater than the control threshold (Step S103). Then, if it is determined that the path change count is greater than the control threshold (Yes at Step S103), the congestion control message generating unit 212 generates a congestion control message (Step S104). In other words, if the congestion detection unit 210 determines that the path change count is greater than the control threshold, this determination indicates that a path of a packet is frequently changed due to the congestion occurring in the communication path of the packet. As described above, if the congestion detection unit 210 detects that congestion has occurred in a communication path of a packet, the congestion control message generating unit 212 generates a congestion control message.

In contrast, if the congestion detection unit 210 determines that the path change count is not greater than the control threshold (No at Step S103), the congestion detection unit 210 determines whether congestion control is being performed (Step S105). Specifically, the congestion detection unit 210 determines whether the node devices 300-1 to 300-m have been instructed to take an action to avoid congestion of the communication path. If the congestion control is being performed (Yes at Step S105), the congestion detection unit 210 determines whether the path change count is less than the cancel threshold (Step S106). If the path change count is less than the cancel threshold (Yes at Step S106), the congestion cancel message generating unit 214 generates a congestion cancel message (Step S107). In other words, if the congestion detection unit 210 determines that the path change count is less than the cancel threshold, the determination result indicates that the occurrence of the path change of a packet decreases because the congestion of the communication path of the packet is relieved. As described above, if the congestion detection unit 210 does not detect that the congestion has occurred in the communication path of the packet anymore, the congestion cancel message generating unit 214 generates a congestion cancel message. Furthermore, the congestion cancel message generating unit 214 may also identify a node device in which the path change count is below the cancel threshold, record the node device, and then attach the ID of the identified node device to the congestion cancel message. In such a case, the node devices 300-1 to 300-m cancel the action taken to avoid the congestion in the communication path only when the node ID attached to the congestion cancel message corresponds to own node ID.

If a congestion control message is generated at Step S104 or if a congestion cancel message is generated at Step S107, the message transmitting unit 216 broadcasts the control/cancel message (Step S108). In contrast, if it is determined that the congestion control is not being performed at Step S105 or if it is determined that the path change count is not less than the cancel threshold at Step S106, the process is ended.

As described above, according to the embodiment, because the gateway device 200 where traffic is most concentrated detects the occurrence of congestion, the congestion can be promptly detected. Consequently, it is possible to prevent the occurrence of traffic that exceeds the capacity of the network at the periphery of the gateway device. Furthermore, because the gateway device 200 transmits a congestion control message to the entire network in the communication system 100 and all of the node devices 300-1 to 300-m in the network take an action to avoid congestion, the occurrence of congestion can be efficiently suppressed. Consequently, according to the embodiment, it is possible to shorten the period of time taken to end congestion.

Furthermore, in the above explanation, the gateway device 200 detects congestion in a communication path of a packet and then broadcasts a congestion control message to the node devices 300; however, the configuration is not limited thereto. Specifically, the node devices 300-1 to 300-m may also detect congestion in a communication path of a packet and then broadcast a congestion control message to other node devices. In the following, a description will be given of a case, as an example, in which the node device 300-3 detects congestion in a communication path of a packet. Packets are transmitted, in a concentrated manner, from the node devices 300-8 to 300-m to the node device 300-3, which functions as a relay node device. If packets are not able to be transmitted from the node devices 300-6 and 300-7 to the node device 300-2, the packets are transmitted from the node devices 300-6 and 300-7 to the node device 300-3. In other words, in a similar manner to the gateway device 200, the packets are transmitted, in a concentrated manner, to the node device 300-3 and thus congestion may possibly occur in a communication path. Accordingly, it is possible for the node device 300-3 to use the same configuration as that used for the gateway device 200 illustrated in FIG. 2. In such a case, between the transmission source node device and the gateway device 200, the node device 300 receives the packet that has been transmitted from the transmission source node device to the gateway device 200 via a wireless ad hoc network. The process performed after the packet is received is the same as that performed by the gateway device 200.

Figure 5:
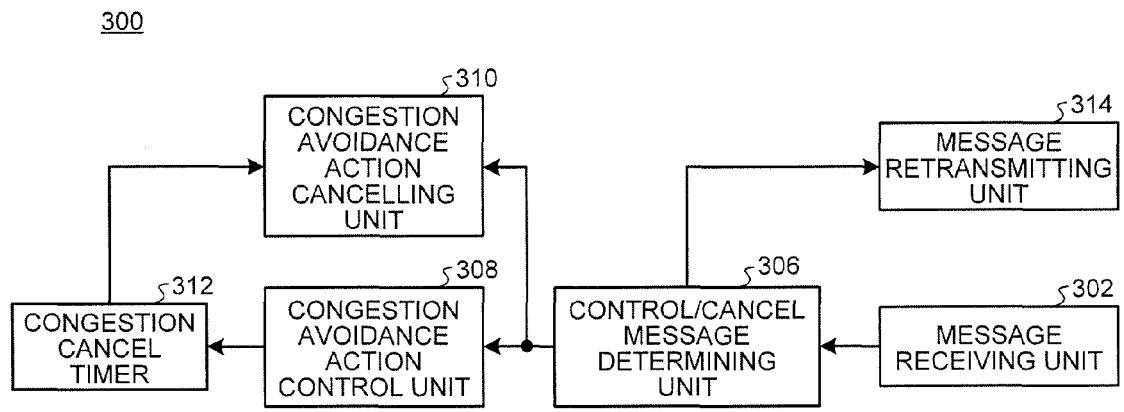
FIG. 5 is a block diagram illustrating a first configuration of a node device according to the embodiment.

FIG. 5 is a block diagram illustrating a first configuration of a node device according to the embodiment. As illustrated in FIG. 5, the node device 300 includes a message receiving unit 302, a control/cancel message determining unit 306, a congestion avoidance action control unit 308, a congestion avoidance action cancelling unit 310, a congestion cancel timer 312, and a message retransmitting unit 314.

The message receiving unit 302 receives the control/cancel message 400 broadcasted by the message transmitting unit 216. The control/cancel message determining unit 306 refers to the control/cancel flag 402 in the control/cancel message 400 received by the message receiving unit 302. Then, on the basis of the result of referring to the control/cancel flag 402, the control/cancel message determining unit 306 determines whether the control/cancel message 400 represents a congestion control message or a congestion cancel message or represents another type of message.

If the control/cancel message determining unit 306 determines that the control/cancel message 400 represents a congestion control message, the congestion avoidance action control unit 308 takes an action to avoid congestion in a communication path. If the control/cancel message determining unit 306 determines that the control/cancel message 400 represents a congestion cancel message, the congestion avoidance action cancelling unit 310 cancels the action taken to avoid congestion in the communication path.

The congestion cancel timer 312 is a timer that is used to cancel an action taken to avoid congestion in a communication path. Specifically, if the congestion avoidance action control unit 308 takes an action to avoid congestion in a communication path, the congestion cancel timer 312 starts. Then, if a certain set time has elapsed, the congestion cancel timer 312 notifies the congestion avoidance action cancelling unit 310 that the set time of the timer has elapsed. If the congestion avoidance action cancelling unit 310 receives a notification from the congestion cancel timer 312 indicating that the set time of the timer has elapsed, the congestion avoidance action cancelling unit 310 cancels the action taken to avoid the congestion in the communication path. Specifically, if the control/cancel message 400 representing the congestion cancel message is received or if a notification that the set time of the timer has elapsed is received from the congestion cancel timer 312, the congestion avoidance action cancelling unit 310 cancels the action taken to avoid the congestion in the communication path.

The message retransmitting unit 314 rebroadcasts the control/cancel message 400 that has been received by the message receiving unit 302. For example, the control/cancel message 400 broadcasted from the message transmitting unit 216 in the gateway device 200 is received by the node devices 300-1 to 300-3. The control/cancel message 400 received by the node devices 300-1 to 300-3 is then rebroadcasted by the message retransmitting unit 314 and is then received by the node devices 300-4 to 300-m.

Figure 6:
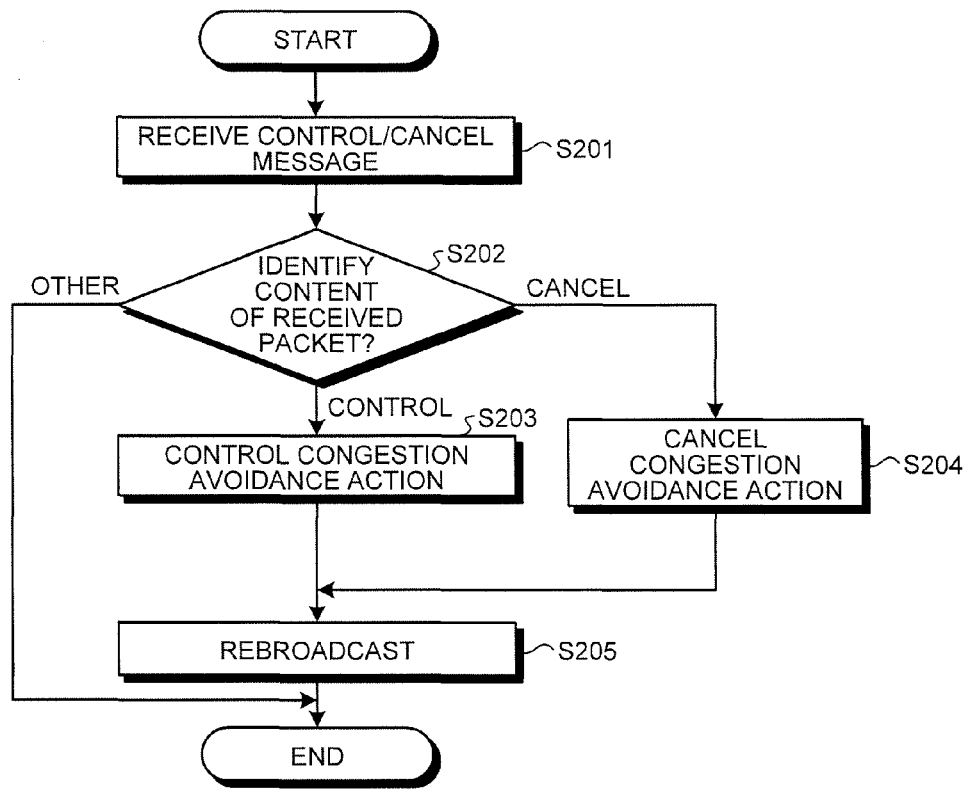
FIG. 6 is a flowchart illustrating the first process performed by the node device.

FIG. 6 is a flowchart illustrating the first process performed by the node device. As illustrated in FIG. 6, first, the message receiving unit 302 receives the control/cancel message 400 that has been broadcasted from any one of the gateway device 200 and the node devices 300-1 to 300-m (Step S201). Then, the control/cancel message determining unit 306 determines whether the control/cancel message 400 received at Step S201 represents a congestion control message or a congestion cancel message or represents another type of message (Step S202).

Then, if it is determined that the control/cancel message 400 represents a congestion control message at Step S201, the congestion avoidance action control unit 308 takes an action to avoid congestion in a communication path (Step S203). If the congestion control action type 406 is included in the control/cancel message 400, the congestion avoidance action control unit 308 takes an action indicated by the type that is set in the congestion control action type 406. If the congestion control action type 406 is not included in the control/cancel message 400, the congestion avoidance action control unit 308 takes an action indicated by the type that has been previously set.

In contrast, if it is determined at Step S202 that the control/cancel message 400 represents a congestion cancel message, the congestion avoidance action cancelling unit 310 cancels the action taken to avoid the congestion in the communication path (Step S204).

Then, if the action to avoid the congestion in the communication path has been taken at Step S203, the message retransmitting unit 314 rebroadcasts the control/cancel message 400 (Step S205). Furthermore, if the action to avoid the congestion in the communication path has been canceled at Step S204, in a similar manner as in the above case, the message retransmitting unit 314 rebroadcasts the control/cancel message 400 (Step S205). If it is determined that the control/cancel message 400 represents another type of message at Step S202, the process is ended.

Figure 7:
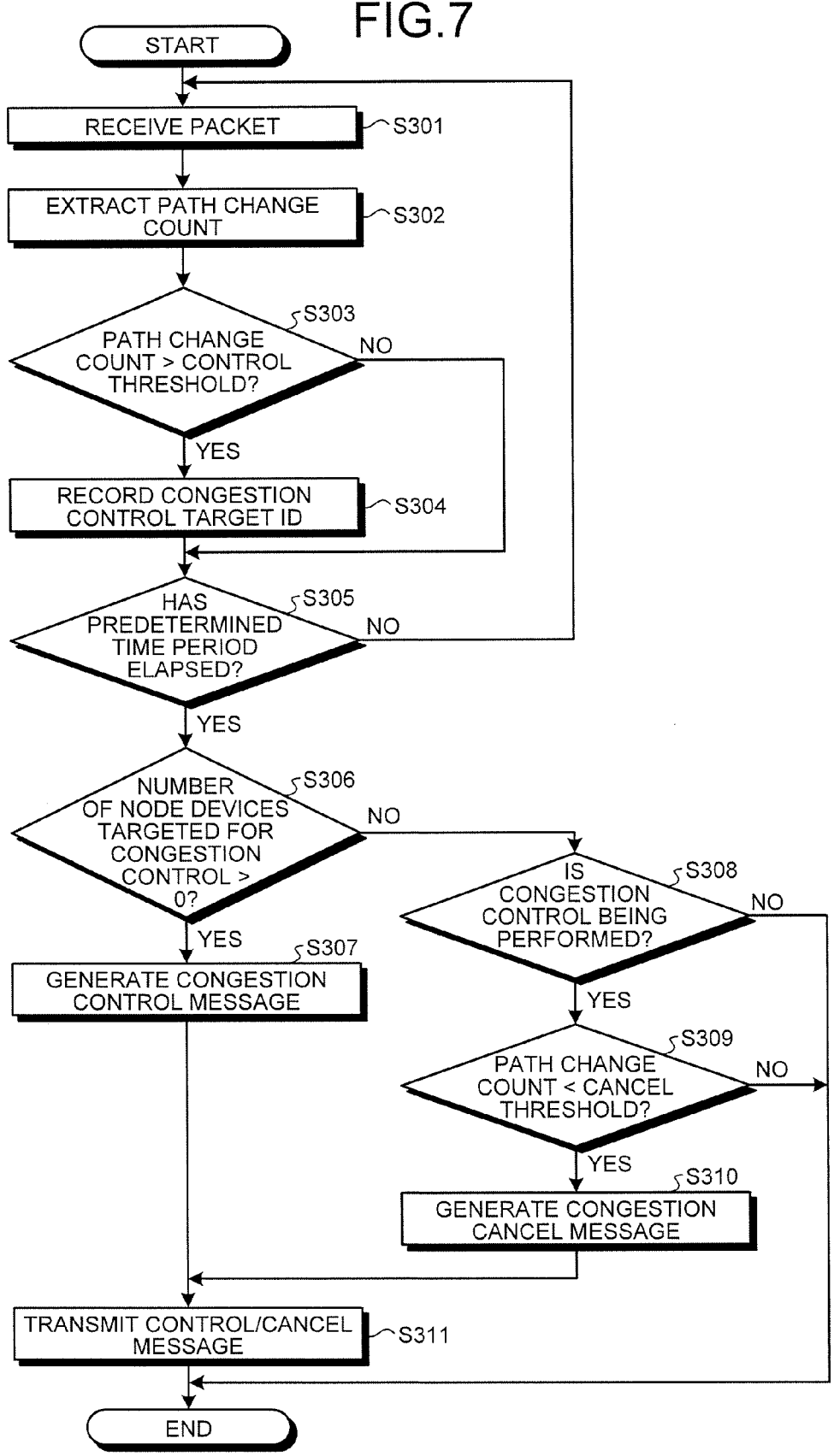
FIG. 7 is a flowchart illustrating a second process performed by the gateway device.

FIG. 7 is a flowchart illustrating a second process performed by the gateway device. The second process performed by the gateway device 200 differs from the first process in that a node device that takes an action to avoid congestion is specified. Accordingly, differences between the first process and the second process will mainly be described below.

As illustrated in FIG. 7, first, the packet receiving unit 204 receives a packet that has been transmitted from any one of the node devices 300-1 to 300-m (Step S301). Then, on the basis of the packet received at Step S301, the path change count extracting unit 208 extracts the communication path change count until the packet reaches the packet receiving unit 204 from the node device that is the transmission source of the packet (Step S302). Then, the congestion detection unit 210 determines whether the communication path change count extracted at Step S302 is greater than the control threshold (Step S303).

Then, if it is determined that the path change count is greater than the control threshold (Yes at Step S303), the congestion detection unit 210 records the ID of the node device that needs to take an action to avoid congestion (Step S304). Specifically, on the basis of the communication path history attached to the received packet, the congestion detection unit 210 detects which communication path is congested. In other words, because the communication path history attached to the received packet indicates that the received packet is transmitted by being relayed from which transmission source node device to which node device, when referring to this history, it is possible to detect which communication path is congested. It is assumed here, for example, that, if no congestion occurs, the packet transmitted from the node device 300-8 is to be transmitted to the gateway device 200 via the node device 300-3. Meanwhile, it is assumed here that, after referring to the communication path history of the packet that was transmitted from the node device 300-8, the packet reaches the gateway device 200 from the node device 300-8 via the node device 300-2. This indicates that, because congestion has occurred in the communication path between the node device 300-8 and the node device 300-3, the transmission of the packet from the node device 300-8 to the node device 300-3 failed and thus the packet was transmitted via the node device 300-2. Accordingly, the congestion detection unit 210 determines the node device 300-8 as the node device that needs to take an action to avoid congestion and then records the ID (identification) of the node device 300-8.

Then, the congestion detection unit 210 determines whether the certain time period has elapsed (Step S305). The congestion detection unit 210 repeats the processes at Steps S301 to S304 until the certain time period has elapsed. If the certain time period has elapsed (Yes at Step S305), the congestion detection unit 210 determines whether the number of node devices that need to take an action to avoid the congestion is greater than 0 (Step S306).

If it is determined that the number of node devices that need to take an action to avoid the congestion is greater than 0 (Yes at Step S306), the congestion control message generating unit 212 generates a congestion control message (Step S307). Here, the congestion control message generating unit 212 sets a flag, which is associated with a congestion control message, in the control/cancel flag 402 and sets the ID of the node device that needs to take an action to avoid congestion in the congestion control target ID 404.

In contrast, if it is determined that the number of node devices that need to take an action to avoid the congestion is 0 (No at Step S306), the congestion detection unit 210 determines whether congestion control is being performed (Step S308). If congestion control is being performed (Yes at Step S308), the congestion detection unit 210 determines whether the path change count is less than the cancel threshold (Step S309). If the path change count is less than the cancel threshold (Yes at Step S309), the congestion cancel message generating unit 214 generates a congestion cancel message (Step S310).

If a congestion control message is generated at Step S307 or a congestion cancel message is generated at Step S310, the message transmitting unit 216 broadcasts the control/cancel message 400 (Step S311). In contrast, if it is determined at Step S308 that congestion control is not being performed or if it is determined at Step S309 that the path change count is not less than the cancel threshold, the process is ended.

Figure 8:
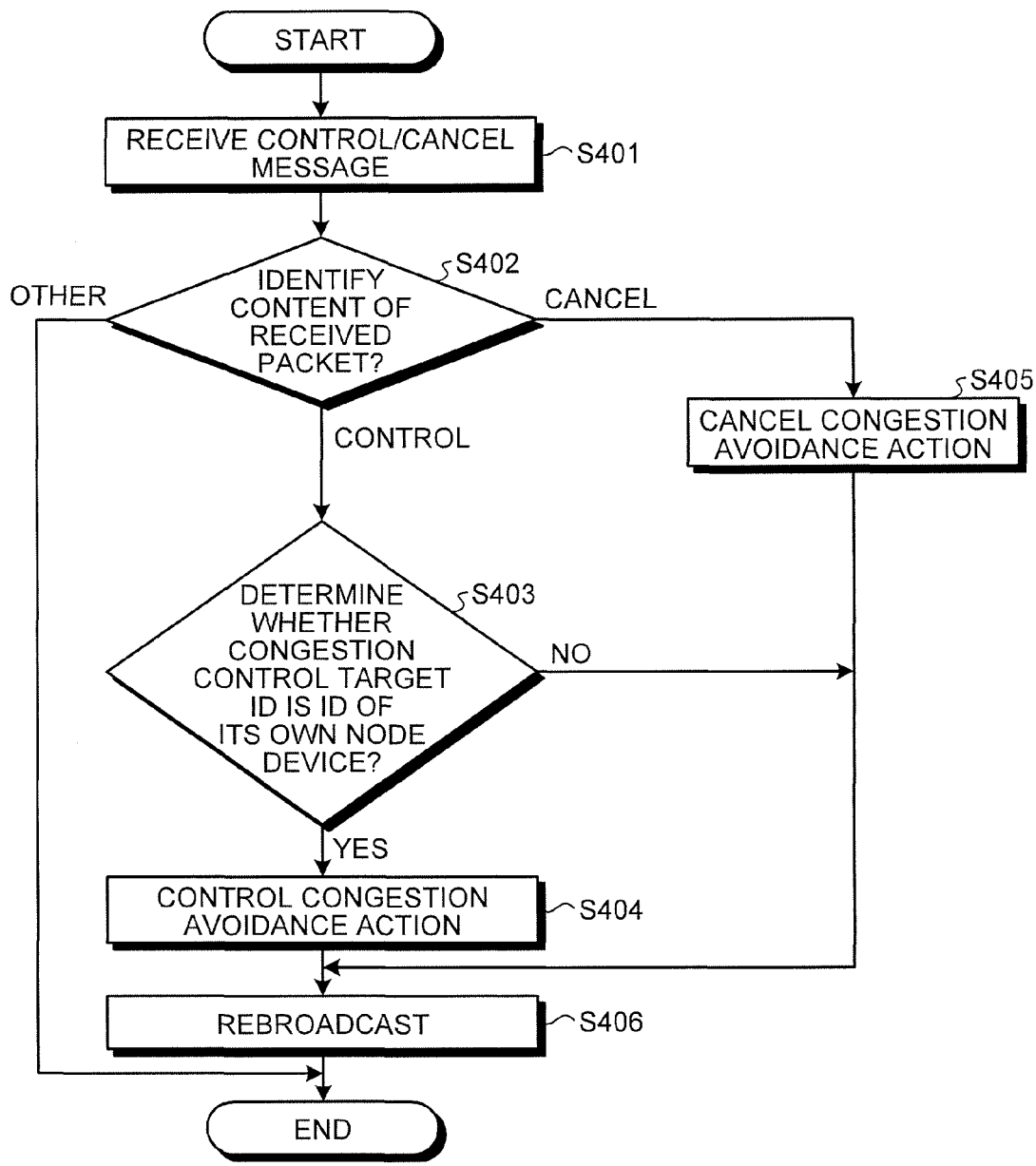
FIG. 8 is a flowchart illustrating the second process performed by the node device.

FIG. 8 is a flowchart illustrating the second process performed by the node device. The second process performed by the node devices 300-1 to 300-*m* differs from the first process in that it is determined whether a node device is a device that needs to take an action to avoid congestion. Accordingly, differences between the first process and the second process will mainly be described below.

As illustrated in FIG. 8, first, the message receiving unit 302 receives the control/cancel message 400 that has been broadcasted from the gateway device 200 or any one of the node devices 300-1 to 300-*m* (Step S401). Then, the control/cancel message determining unit 306 determines whether the control/cancel message 400 received at Step S201 represents a congestion control message, a congestion cancel message, or another type of message (Step S402).

Then, if it is determined that the control/cancel message 400 represents a congestion control message at Step S402, the congestion avoidance action control unit 308 determines whether the congestion control target ID matches the ID of the node device that received the control/cancel message 400 (Step S403). Specifically, the congestion avoidance action control unit 308 determines whether the ID set to the congestion control target ID 404 matches the ID of the node device that received the control/cancel message 400. If it is determined that the congestion control target ID matches the ID of the node device that received the control/cancel message 400 (Yes at Step S403), the congestion avoidance action control unit 308 takes an action to avoid the congestion in the communication path (Step S404).

In contrast, if it is determined that the control/cancel message 400 represents the congestion cancel message at Step S402, the congestion avoidance action cancelling unit 310 cancels an action taken to avoid the congestion in the communication path (Step S405).

Then, if the action taken to avoid the congestion in the communication path has been taken at Step S404, the message retransmitting unit 314 rebroadcasts the control/cancel message 400 (Step S406). Furthermore, if the action taken to avoid the congestion in the communication path is cancelled at Step S405, in a similar manner as in the above case, the message retransmitting unit 314 rebroadcasts the control/cancel message 400 (Step S406). Furthermore, if it is determined at Step S403 that the congestion control target ID does not match the ID of the node device that received the control/cancel message 400, the message retransmitting unit 314 rebroadcasts the control/cancel message 400 (Step S406). Furthermore, if it is determined at Step S402 that the control/cancel message 400 represents another type of message, the process is ended.

As described above, with the second process performed by the gateway device 200 and the second process performed by the node device 300, it is possible to efficiently suppress the occurrence of congestion. Specifically, with the second process performed by the gateway device 200 and the second process performed by the node device, it is possible to detect which communication path is congested. Accordingly, a node device that transmits a packet to the communication path in which congestion has occurred is specified and then the specified node device is targeted as the device that takes an action to avoid the congestion. Consequently, only the node device that transmits a packet to a communication path in which congestion has occurred takes an action to avoid the congestion, thus efficiently suppressing the occurrence of congestion.

Figure 9:
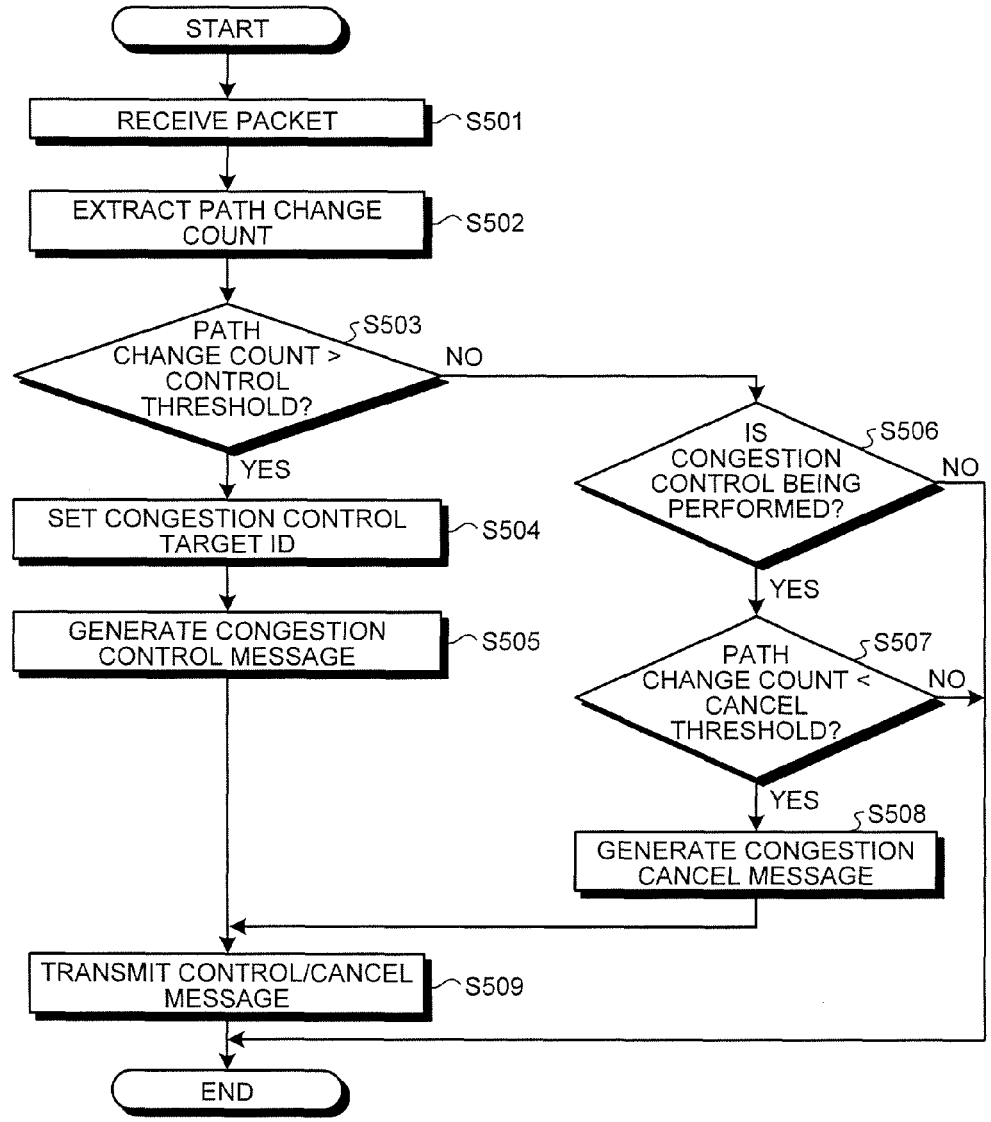
FIG. 9 is a flowchart illustrating a third process performed by the gateway device.

FIG. 9 is a flowchart illustrating a third process performed by the gateway device. The third process performed by the gateway device 200 differs from the second process in that a method for specifying a node device that takes an action to avoid congestion is used. Accordingly, differences between the second process and the third process will mainly be described below.

As illustrated in FIG. 9, first, the packet receiving unit 204 receives a packet from any one of the node devices 300-1 to 300-*m* (Step S501). Then, on the basis of the packet received at Step S501, the path change count extracting unit 208 extracts a communication path change count until the packet reaches the packet receiving unit 204 from the node device that is the transmission source of the packet (Step S502). Then, the congestion detection unit 210 determines whether the communication path change count extracted at Step S502 is greater than the control threshold (Step S503).

Then, if it is determined that the path change count is greater than the control threshold (Yes at Step S503), the congestion control message generating unit 212 sets the ID of the node device that takes an action to avoid congestion in the congestion control target ID 404 (Step S504). Here, the congestion control message generating unit 212 sets the node device targeted for congestion control on the basis of a certain hop count reference value. Specifically, the congestion control message generating unit 212 sets, as a node device targeted for congestion control, a node device that is arranged in an area in which a message can be transmitted with a hop count less than the certain hop count reference value. It is assumed here, for example, that, a hop count reference value that is certain in order to arrange a node device subjected to congestion control is "1". In such a case, node devices that are arranged in an area in which a message can be transmitted from the gateway device 200 with one hop count are the node devices 300-1 to 300-3. Accordingly, the congestion control message generating unit 212 sets, in the congestion control target ID 404, the IDs associated with the node devices 300-1 to 300-3.

Then, the congestion control message generating unit 212 generates a congestion control message (Step S505). Here, the congestion control message generating unit 212 sets a flag associated with the congestion control message in the control/cancel flag 402 that is associated with the congestion control target ID 404 and that is in the control/cancel message 400 in which the ID of the node device subjected to the congestion control is set.

In contrast, if it is determined that the path change count is not greater than the control threshold (No at Step S503), the congestion detection unit 210 determines whether congestion control is being performed (Step S506). If congestion control is being performed (Yes at Step S506), the congestion detection unit 210 determines whether the path change count is less than the cancel threshold (Step S507). If it is determined that the path change count is less than the cancel threshold (Yes at Step S507), the congestion cancel message generating unit 214 generates a congestion cancel message (Step S508).

If a congestion control message is generated at Step S505 or a congestion cancel message is generated at Step S508, the message transmitting unit 216 broadcasts the control/cancel message 400 (Step S509). In contrast, if it is determined at Step S506 that congestion control is not being performed or it is determined at Step S507 that the path change count is greater than the cancel threshold, the process is ended.

As described above, with the third process performed by the gateway device, it is possible to efficiently suppress the occurrence of congestion. Specifically, with the third process performed by the gateway device, on the basis of the certain hop count reference value, the congestion control message generating unit 212 sets a node device that is to be subjected to congestion control. For example, because packets transmitted from the node devices 300-1 to 300-m are concentrated at the gateway device 200, congestion is likely to occur in the communication path at the periphery of the gateway device 200. In this regard, because only the node device that transmits a packet to the gateway device 200 by using a communication path with a low hop count can be targeted for the device that takes an action to avoid congestion, the occurrence of congestion is efficiently suppressed.

Figure 10:
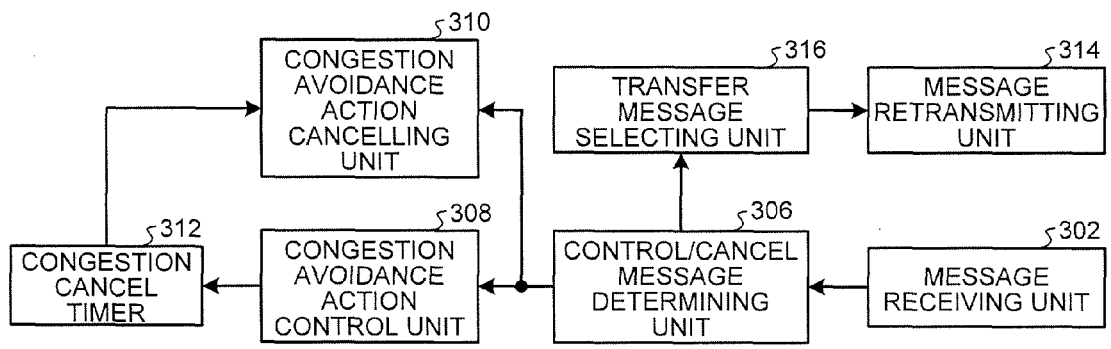
FIG. 10 is a block diagram illustrating a second configuration of the node device according to the embodiment.

FIG. 10 is a block diagram illustrating a second configuration of the node device according to the embodiment. The second configuration of the node devices 300-1 to 300-m differs from the first configuration in that a transfer message selecting unit 316 is added. Accordingly, a description of the configurations that overlap with the first configuration, i.e., the configuration of the message receiving unit 302, the control/cancel message determining unit 306, the congestion avoidance action control unit 308, the congestion avoidance action cancelling unit 310, the congestion cancel timer 312, and the message retransmitting unit 314, will be omitted.

The transfer message selecting unit 316 determines whether the control/cancel message 400 is to be rebroadcasted on the basis of a node device that has transmitted the control/cancel message 400 to the subject node device. Specifically, the transfer message selecting unit 316 allows the received control/cancel message 400 to be rebroadcasted only when the control/cancel message 400 is received from a node device in which the hop count from the gateway device 200 is less than that of the subject node device. For example, for the node device 300-8, a hop count of the node device 300-8 from the gateway device 200 is "2". Consequently, the node device 300-8 rebroadcasts only when it receives the control/cancel message 400 from the node devices 300-1 to 300-3 in which a hop count from the gateway device 200 is "1", which is less than "2". Furthermore, only when the control/cancel message 400 is received from the relay node device that is closest to the subject node device and that relays a packet, whose destination is the gateway device 200, transmitted from the subject node device, the received control/cancel message 400 may be rebroadcasted. For example, for the node device 300-8, the closest relay node device when the node device 300-8 transmits a packet to the gateway device 200 is the node device 300-3. Consequently, the node device 300-8 rebroadcasts only when it has received the control/cancel message 400 from the node device 300-3.

With the second configuration of the node device 300, it is possible to suppress the occurrence of congestion due to the broadcast of the control/cancel message 400. Specifically, if the gateway device 200 and the node device 300 frequently broadcast the control/cancel message 400, the state of congestion may possibly become worse due to the broadcasted control/cancel message 400. However, only when the control/cancel message 400 is received from the node device in which the hop count from the gateway device 200 is lower than the subject node device, the transfer message selecting unit 316 allows the received control/cancel message 400 to be rebroadcasted. Furthermore, only when the control/cancel message 400 is received from the relay node device closest to the subject node device and relaying the packet, whose destination is the gateway device 200, transmitted from the subject node device, the transfer message selecting unit 316 allows the received control/cancel message 400 to be rebroadcasted. As described above, with the transfer message selecting unit 316, because the number of times the control/cancel message 400 is rebroadcasted decreases, it is possible to prevent the state of congestion from becoming worse due to the rebroadcasting of the control/cancel message 400.

Figure 11:
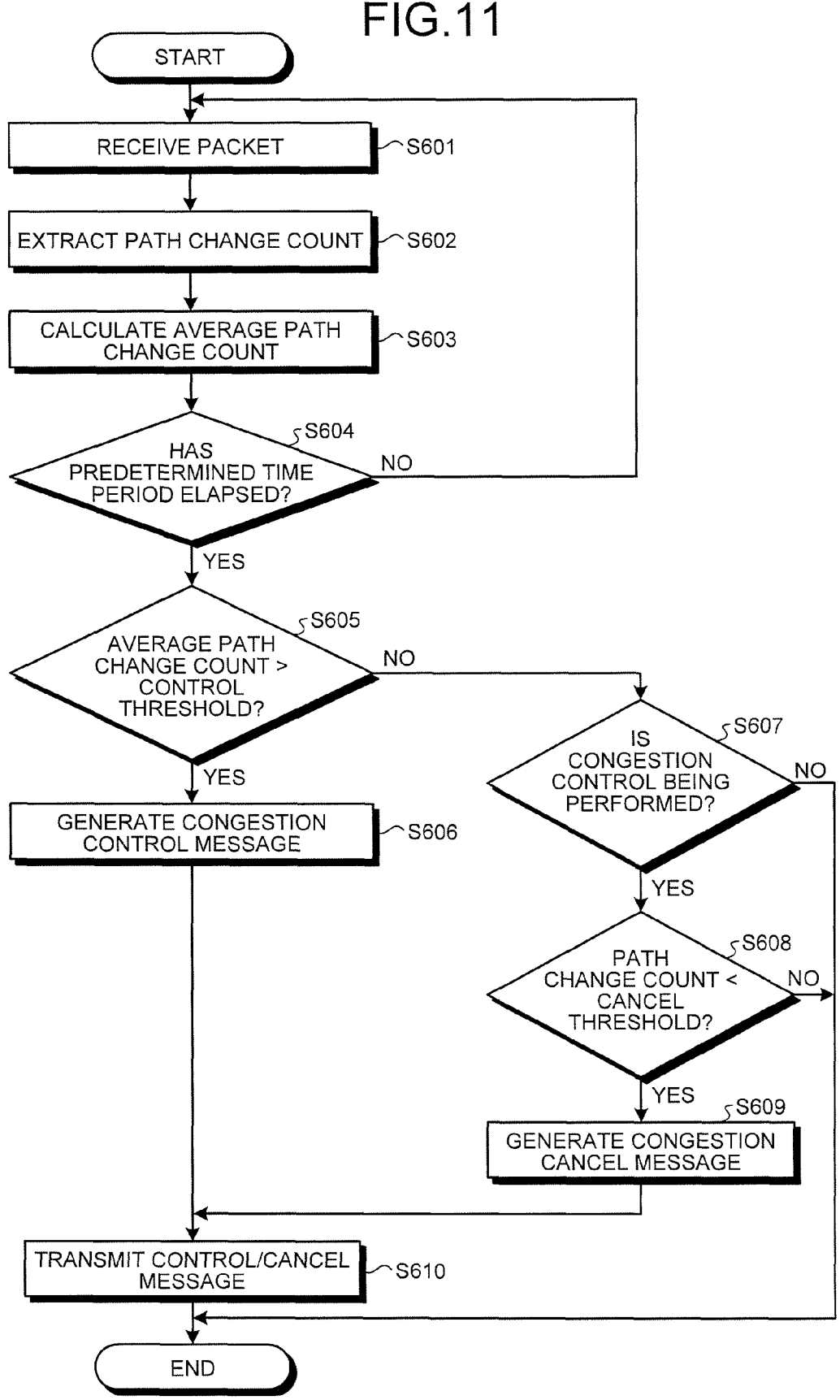
FIG. 11 is a flowchart illustrating a fourth process performed by the gateway device.

FIG. 11 is a flowchart illustrating a fourth process performed by the gateway device. The fourth process performed by the gateway device 200 differs from the first process in that the average value of path change counts during a certain time period is obtained. Accordingly, differences between the first process and the fourth process will mainly be described below.

As illustrated in FIG. 11, first, the packet receiving unit 204 receives a packet that has been transmitted from any one of the node devices 300-1 to 300-m (Step S601). Then, on the basis of the packet received at Step S601, the path change count extracting unit 208 extracts a communication path change count until the packet reaches the packet receiving unit 204 from the node device that is the transmission source of the packet (Step S602). Then, the path change count extracting unit 208 calculates an average path change count (Step S603). Then, the path change count extracting unit 208 determines whether the certain time period has elapsed (Step S604). If it is determined that the certain time period has not elapsed (No at Step S604), the path change count extracting unit 208 returns to Step S601 and repeats the processes at Steps S601 to S603 until the certain time period has elapsed.

Consequently, the average value of the path change count in the certain time period can be obtained.

If it is determined that the certain time period has elapsed (Yes at Step S604), the congestion detection unit 210 determines whether the average path change count extracted at Step S603 is greater than the control threshold (Step S605). If it is determined that the average path change count is greater than the control threshold (Yes at Step S605), the congestion control message generating unit 212 generates a congestion control message (Step S606).

In contrast, if it is determined that the average path change count is less than the control threshold (No at Step S605), the congestion detection unit 210 determines whether congestion control is being performed (Step S607). If congestion control is being performed (Yes at Step S607), the congestion detection unit 210 determines whether the path change count is less than the cancel threshold (Step S608). If it is determined that the path change count is less than the cancel threshold (Yes at Step S608), the congestion cancel message generating unit 214 generates a congestion cancel message (Step S609).

If a congestion control message is generated at Step S606 or if a congestion cancel message is generated at Step S609, the message transmitting unit 216 broadcasts the control/cancel message 400 (Step S610). In contrast, if it is determined at Step S607 that congestion control is not being performed or if it is determined at Step S608 that the path change count is greater than the cancel threshold, the process is ended.

As described above, with the fourth process performed by the gateway device, the average value of the path change counts in a certain time period is obtained and then congestion in a communication path is detected on the basis of the obtained average path change count. Accordingly, with the fourth process performed by the gateway device, because it is possible to accurately obtain the state of congestion in a communication path, congestion control and congestion cancellation can be accurately performed.

In the embodiment described above, a description has mainly been given of the communication device, i.e., the gateway device 200 and the node device 300, the communication system 100, and the communication method; however, the embodiment is not limited thereto. It is also possible to implement the same function as that described in the embodiment by executing a communication program prepared in advance and executed by a computer. Specifically, the communication program causes the computer to execute a process for receiving a packet transmitted from a node device, which is the transmission source of the packet, via a wireless ad hoc network. Furthermore, the communication program causes the computer to execute a process for detecting, on the basis of the received packet, congestion that has occurred in a communication path along which the packet reaches the packet receiving unit. Furthermore, the communication program causes the computer to execute a process for generating a congestion control message that instructs, when it is detected that congestion has occurred in the communication path, that an action is taken to avoid the congestion in the communication path. Furthermore, the communication program causes the computer to execute a process for broadcasting the generated congestion control message. The communication program can be delivered to the computer via a communication network, such as the Internet. Furthermore, the communication program may also be stored in a computer readable recording medium, such as a memory, a hard disk, and the like, and be implemented by the computer reading the program from the recording medium.

According to an aspect of an embodiment of the communication device, it is possible to efficiently suppress the occurrence of congestion of a packet in a wireless ad hoc network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   a packet receiving unit configured to receive, via a wireless ad hoc network, a packet transmitted from a node device;
   a congestion detection unit configured to detect, based on history of a busy count attached to the packet received by the packet receiving unit, congestion occurring in a communication path along which the packet reaches the packet receiving unit;
   a congestion control message generating unit configured to generate, when the congestion detection unit detects that the congestion has occurred in the communication path, a congestion control message that instructs to take an action to avoid the congestion in the communication path;
   a message transmitting unit configured to transmit the congestion control message generated by the congestion control message generating unit to the node device; and
   a busy count extracting unit configured to obtain, when the packet is transmitted by using a carrier sense method, a busy count that occurs until the packet reaches the packet receiving unit from a transmission source of the packet, based on the history of the busy count that is attached to the packet received by the packet receiving unit, the busy count indicating that, when the transmission source transmits the packet, another node device is transmitting a packet to the same destination, wherein when the busy count obtained by the busy count extracting unit exceeds a certain control threshold, the congestion detection unit determines that the congestion has occurred in the communication path.

2. The communication device according to claim 1, further comprising a path change count extracting unit configured to obtain, based on the communication path history attached to the packet received by the packet receiving unit, a number of times communication paths are changed until the packet reaches the packet receiving unit from a transmission source of the packet, wherein when the number of times obtained by the path change count extracting unit exceeds a certain control threshold, the congestion detection unit determines that the congestion has occurred in the communication path.

3. The communication device according to claim 1, wherein the congestion control message generating unit is configured to generate a message in which an identifier of a node device to take the action to avoid the congestion is attached to the congestion control message.

4. The communication device according to claim 1, wherein the congestion control message generating unit is configured to generate a message in which a congestion control action type that includes information on packet disposal, retransmission count suppression, transfer path count suppression or packet transmission frequency suppression, or any combination thereof is attached to the congestion control message.

5. The communication device according to claim 1, wherein the message transmitting unit is further configured to broadcast the congestion control message generated by the congestion control message generating unit.

6. The communication device according to claim 1, further comprising a congestion cancel message generating unit configured to generate a congestion cancel message that instructs to cancel the action taken to avoid the congestion in the communication path when the congestion detection unit does not detect that the congestion occurs in the communication path after the congestion detection unit detects that the congestion has occurred in the communication path, wherein the message transmitting unit is configured to broadcast the congestion cancel message generated by the congestion cancel message generating unit.

7. A communication system comprising:
a plurality of node devices and a gateway device configured to perform communication via a wireless ad hoc network, wherein the gateway device includes:
   a packet receiving unit configured to receive, via the wireless ad hoc network, a packet transmitted from a node device,
   a congestion detection unit configured to detect, based on history of a busy count attached to the packet received by the packet receiving unit, congestion occurring in a communication path along which the packet reaches the packet receiving unit,
   a congestion control message generating unit configured to generate, when the congestion detection unit detects that the congestion has occurred in the communication path, a congestion control message that instructs to take an action to avoid the congestion in the communication path,
   a message transmitting unit configured to transmit the congestion control message generated by the congestion control message generating unit to the node device,
   a busy count extracting unit configured to obtain, when the packet is transmitted by using a carrier sense method, a busy count that occurs until the packet reaches the packet receiving unit from a transmission source of the packet, based on the history of the busy count that is attached to the packet received by the packet receiving unit, the busy count indicating that, when the transmission source transmits the packet, another node device is transmitting a packet to the same destination, wherein when the busy count obtained by the busy count extracting unit exceeds a certain control threshold, the congestion detection unit determines that the congestion has occurred in the communication path, and
each of the node devices includes:
   a message receiving unit configured to receive the transmitted congestion control message,
   a congestion avoidance action control unit configured to take the action to avoid the congestion in the communication path when the message receiving unit receives the congestion control message, and
   a message retransmitting unit configured to retransmit the congestion control message received by the message receiving unit.

8. The communication system according to claim 7, wherein:
the message transmitting unit is further configured to broadcast the congestion control message generated by the congestion control message generating unit, and
the message retransmitting unit is further configured to rebroadcast the congestion control message received by the message receiving unit.

9. The communication system according to claim 7, wherein:
the gateway device further includes a congestion cancel message generating unit configured to generate a congestion cancel message that instructs to cancel the action taken to avoid the congestion in the communication path when the congestion detection unit does not detect that congestion occurs in the communication path after the congestion detection unit detects that the congestion has occurred in the communication path,
each of the node devices further includes a congestion avoidance action cancelling unit configured to cancel the action taken to avoid the congestion in the communication path when the message receiving unit receives the congestion cancel message,
the message transmitting unit is further configured to broadcast the congestion cancel message generated by the congestion cancel message generating unit, and
the message retransmitting unit is further configured to rebroadcast the congestion cancel message received by the message receiving unit.

10. The communication system according to claim 7, wherein:
the congestion control message generating unit is further configured to generate a message in which an identifier of a node device to take the action to avoid the congestion is attached to the congestion control message, and
when the identifier of the node included in the message matches own identifier of the node device, the congestion avoidance action control unit is further configured to take the action to avoid the congestion in the communication path.

11. The communication system according to claim 7, wherein:
each of the node devices further includes a transfer message selecting unit configured to:
   cause the message retransmitting unit to rebroadcast the congestion control message or a congestion cancel message, only when the congestion control message or the congestion cancel message is received from a node device whose hop count from the gateway device is smaller than a hop count of the node device, or
   cause the message retransmitting unit to rebroadcast the congestion control message or the congestion cancel message, only when the congestion control message or the congestion cancel message is received from a closest relay node device relaying a packet whose destination is the gateway device and that is transmitted from the node device.

12. A non-transitory computer readable storage medium having stored therein a communication program configured to cause a computer to execute a process comprising:
receiving, via a wireless ad hoc network, a packet transmitted from a node device;
detecting, based on history of a busy count attached to the packet received, congestion occurring in a communication path along which the packet is transferred;
generating, when it is detected that the congestion has occurred in the communication path, a congestion control message that instructs to take an action to avoid the congestion in the communication path;
transmitting the congestion control message generated to the node device; and
obtaining, when the packet is transmitted by using a carrier sense method, a busy count that occurs until the packet reaches the packet receiving unit from a transmission source of the packet, based on the history of the busy count that is attached to the packet received by the packet receiving unit, the busy count indicating that, when the transmission source transmits the packet, another node device is transmitting a packet to the same destination, wherein when the busy count obtained by the busy count extracting unit exceeds a certain control threshold, the congestion detection unit determines that the congestion has occurred in the communication path.

13. The non-transitory computer readable medium according to claim 12, wherein the transmitting comprises broadcasting the congestion control message generated.

* * * * *